June 6, 1933.  F. E. WIGERT  1,912,559
CONSTANT MESH SELF CONTROLLED TRANSMISSION
Filed June 30, 1932    2 Sheets-Sheet 1

Inventor
Frank E. Wigert
By Clarence A. O'Brien
Attorney

June 6, 1933. F. E. WIGERT 1,912,559
CONSTANT MESH SELF CONTROLLED TRANSMISSION
Filed June 30, 1932 2 Sheets-Sheet 2

Inventor
Frank E. Wigert
By Clarence A. O'Brien
Attorney

Patented June 6, 1933

1,912,559

UNITED STATES PATENT OFFICE

FRANK E. WIGERT, OF LOS ANGELES, CALIFORNIA

CONSTANT MESH SELF-CONTROLLED TRANSMISSION

Application filed June 30, 1932. Serial No. 620,270.

This invention relates to a constant mesh self-controlled transmission, the general object of the invention being to provide governor controlled means for automatically controlling the speed at which a driven shaft is rotated from a drive shaft, with the gears between a main shaft and a counter-shaft constantly in mesh and each provided with free wheeling when desired.

This invention also consists in certain other features of construction and in the combination and arrangement of the several parts to be hereinafter fully described, illustrated in the accompanying parts, and specifically pointed out in the appended claims.

In describing the invention in detail, reference will be had to the accompanying drawings wherein like characters denote like or corresponding parts throughout the several views, and in which:—

Figure 1:
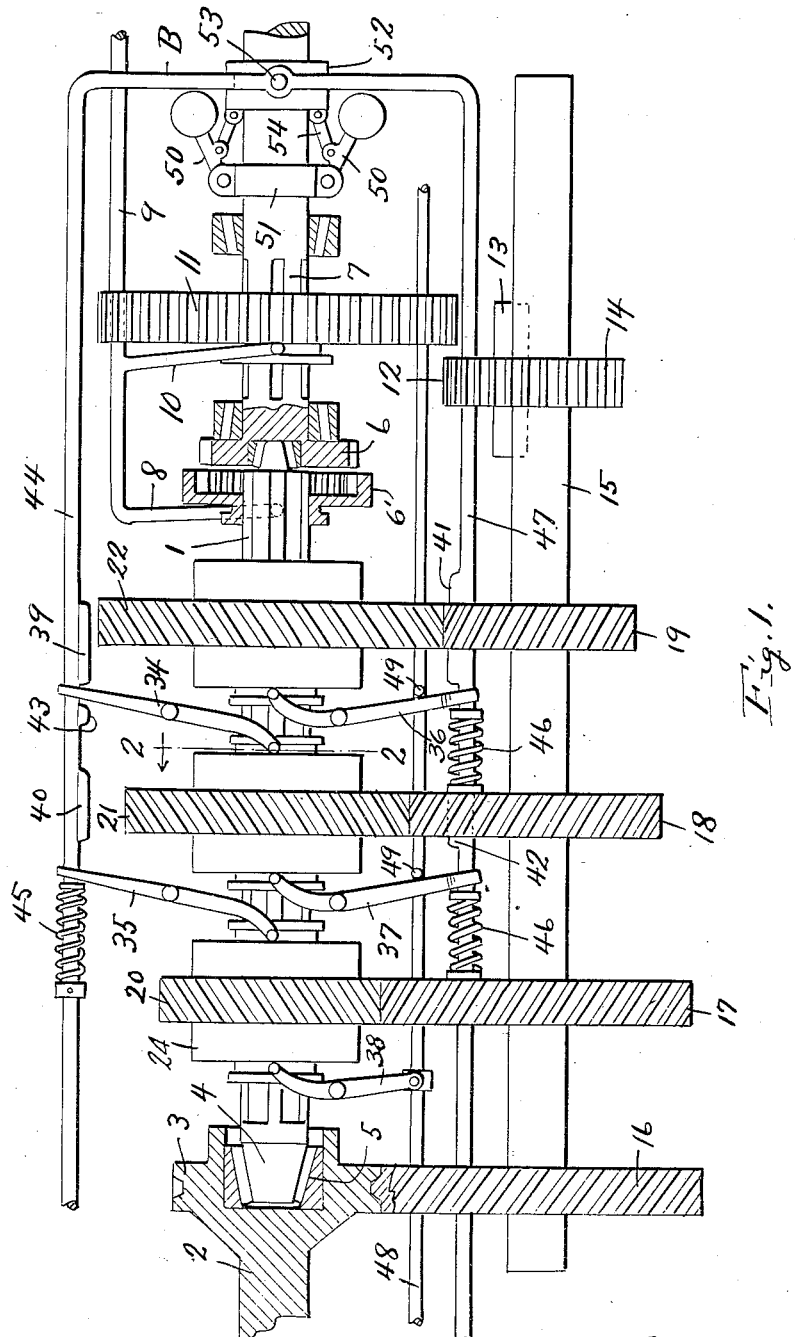
Figure 1 is an elevation with parts in section showing the invention diagrammatically.
Figure 2:
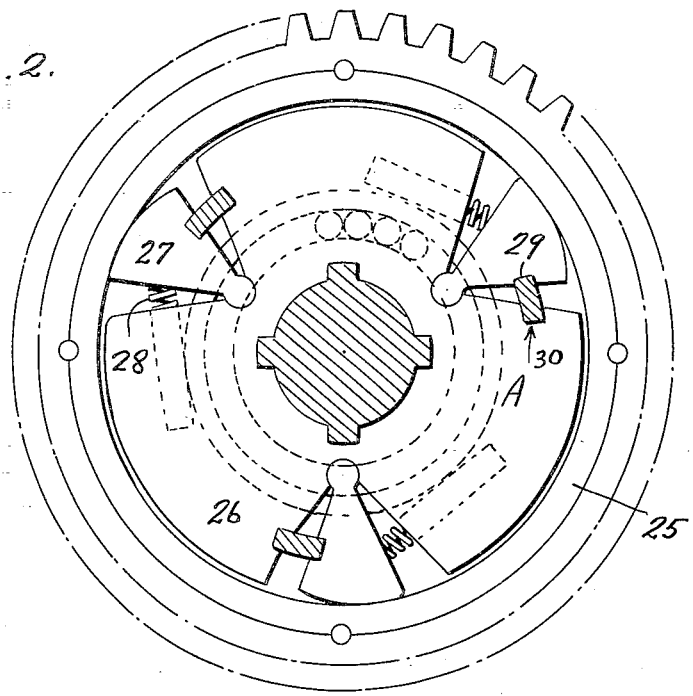
Fig. 2 is a section on line 2—2 of Fig. 1.
Figure 3:
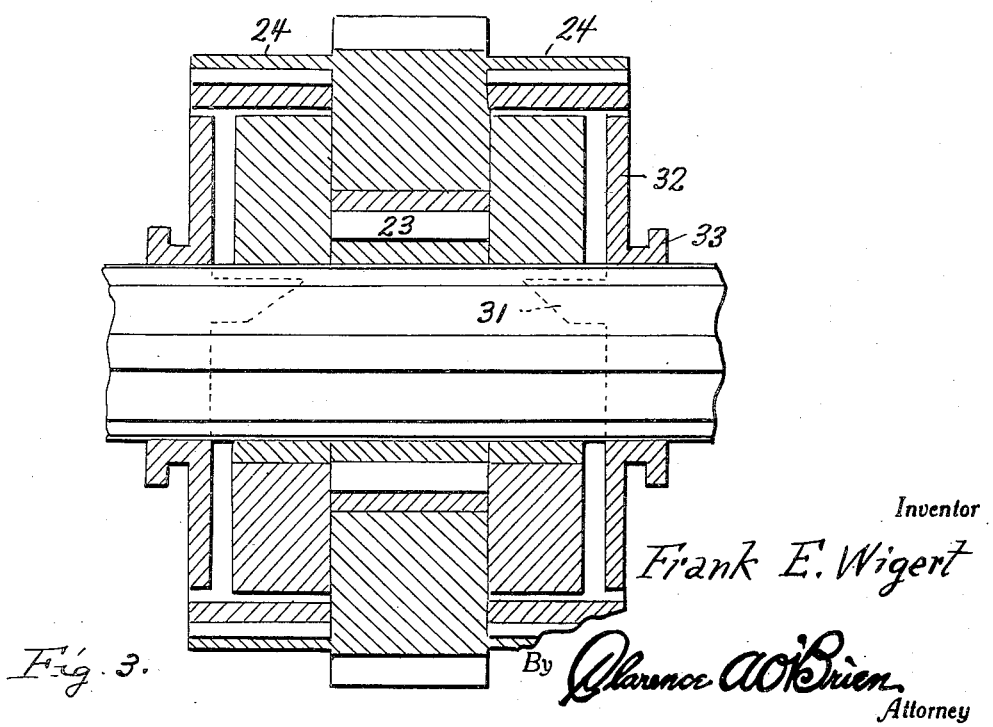
Fig. 3 is a fragmentary longitudinal sectional view through one of the gears and the clutch means associated therewith with the shaft in elevation.

In the drawings, the numeral 1 indicates the main floating shaft which is splined as shown, and the numeral 2 indicates the drive shaft which is formed with the gear 3 which has a socket therein to receive the tapered end 4 of the shaft 1, anti-friction means 5 being provided with this end of the shaft 1. The other end of the shaft 1 is also tapered to fit in a socket in a male gear 6 on the driven shaft 7 and this end is also provided with anti-friction means and the rear end of the shaft 1 carries the female gear 6' which is slidably but non-rotatably arranged on the shaft 1 so that it can be moved into and out of engagement with the male gear 6, this gear 6' being actuated by the fork 8 of the operating rod 9 which also has a fork 10 for sliding the reverse gear 11, slidably but non-rotatably arranged on the shaft 7, and which is adapted to engage with an idle gear 12 on its stub shaft 13 which in turn meshes with the reverse gear 14 on the counter-shaft 15. The front end of this countershaft has attached thereto the gear 16 which is in constant mesh with the gear 3 and said countershaft has attached thereto the high gear 17, the intermediate gear 18 and the low speed gear 19, the gear 17 meshing with a gear 20, the gear 18 meshing with a gear 21 and the gear 19 meshing with a gear 22 these gears 20, 21 and 22 being carried by the main shaft 1 and rotatably supported thereon by means of the anti-friction members 23 the inner races of which are splined to the shaft 1.

Each of these gears 20, 21 and 22 is provided with a clutch housing 24 at each side thereof to the inner wall of which is pinned a pawl race 25. An overrun clutch shown generally at A is arranged in each housing, and each of these clutches comprises a notched hub member 26 splined to the shaft 1 and having pawls 27 supported for rocking movement in the notches with a spring 28 normally holding each pawl in engagement with the ring 25.

Each pawl is formed with a beveled notch 29 of the hub member 26 and an opposite wall of each notch is formed with a beveled recess 30 for slidingly receiving the tapered projection 31 on the disk 32 splined to the shaft 1 and having a grooved collar 33 at its outer face surrounding the shaft 7.

When the disk 32 is moved inwardly the projections 31 will engage the pawls 27 and move said pawls against the action of the spring 28 to releasing position. The overrun clutch at one side of each of the gears 20, 21 and 22 is oppositely arranged with respect to the overrun clutch at the other side of each of said gears. The clutches at the rear faces of the gears on shaft 1 may be termed "forward drive clutches" and those on the other sides "hold-back clutches".

Members 34 and 35 engage the collars 33 of the disks 32 of the forward drive clutches of the gears 21 and 20 and forks 36 and 37 engage the collars of the members 32 of the holdback clutches of the gears 21 and 22. A short fork 38 engages the collar of the member 32 of the hold-back device of the gear 20. A yoke B has the cams 39 and 40 on one of its limbs for engaging the forks 34 and 35 and the cams 41 and 42 on the other limb for engaging the forks 36 and 37. A projection 43 is also formed on the limb 44 which carries the cams 39 and 40, for engaging the fork 34 on the rearward movement of the yoke and this limb 44 carries a spring 45 for engaging the fork 35 to hold this fork in a position with the member 32 having its projection engaging the pawls of the drive clutch on the gear 20.

Springs 46 are arranged on the other limb 47 of the yoke and engage the forks 36 and 37 for normally holding the members 32 in releasing position.

The fork 38 is pivotally connected to a rod 48 supported for sliding movement, and this rod carries the pins 49 engaging the forks 36 and 37 for moving said forks against the action of the springs 46 when the rod 48 is moved to operative position, this movement of the rod moving the forks 36, 37 and 38 to a position where the members 32 will be moved to positions to cause the projections to move the pawls 27 to inoperative position.

This rod 48 and the rod 9 are operated from any suitable means located on the instrument board or other parts of the vehicle, the rod 48 being moved to operative position when free wheeling is desired and the operating means for the rod 9 having three different positions, one for forward position, the other for neutral position and the third for reverse position.

From the foregoing it will be seen that the first speed is from the shaft 2, gears 3 and 16 to the shaft 15 and from said shaft 15 through gears 19 and 22 and the forward clutch means of the gear 22 to the shaft 1 and from the said shaft 1 through the gears 6 and 6' to the shaft 7.

The governor arms 50 are attached to the shaft 7 by the collar 51 and links 54 connect the arms with the collar 52 slidably arranged on the shaft 7 and connected to the yoke B as at 53. Thus as the shaft 7 picks up speed, weighted arms 50 swing outwardly and thus move the yoke B forwardly which causes the cam 39 to engage the fork 34 which moves the member 32 of the forward drive clutch of gear 21 to releasing position, so that the pawls of this clutch can engage the shaft 1 and at the same time the cam 41 engages the fork 36 which moves the member 32 of the hold-back clutch of the gear 22 to operative position so that the pawls of this hold-back clutch are moved to inoperative position.

Thus the gear 21 is connected with the shaft 1 so that the vehicle is driven at intermediate speed and then the governor again comes into action to move the yoke B so that the cam 40 will engage the fork 35 and the cam 42 will engage fork 37 whereby the hold-back clutch of the gear 21 is moved into inoperative position and the forward drive clutch of the gear 20 is moved into operative position, so that this high speed gear 20 will drive the shaft 1 and the shaft 7.

It will of course be understood that when the shaft 1 is driven by the intermediate gears 21, said shaft 1 will be rotating faster than the low speed gear 22 and thus the drive clutch of the gear 22 will be released from the shaft and then when the shaft 1 is being driven by the high speed gear 20 the drive clutch of the gear 21 will be overrun by the shaft 1.

As the shaft 1 is being driven by the gear 20, the hold-back clutches of the gears 21 and 22 will be in inoperative position due to the movement of the forks 36 and 37 by the cams 41 and 42, but the hold-back clutch of the gear 20 is in operative position. If free wheeling is desired, the rod 48 is actuated which will move the forks 36, 37 and 38 so as to render all the hold-back clutches inoperative to permit free wheeling.

Thus when the vehicle is in low speed all hold-back clutches are engaged, but the low speed hold-back clutch overrides intermediate and high hold-back clutches and does the holding back so that when the vehicle is standing still, the low hold-back clutch holds the shaft 1 against any tendency to rotate. When in high speed, all forward clutches are engaged but high being the high speed, overrides low and intermediate, and takes the pull and when the apparatus is in high speed, all hold-back clutches are disengaged except high hold-back clutch which needs no other back clutch release and is the same as the low speed, as it needs no forward pull clutch.

It is thought from the foregoing description that the advantages and novel features of the invention will be readily apparent.

It is to be understood that numerous changes may be made in the construction and in the combination and arrangement of the several parts, provided that such changes fall within the scope of the appended claims.

Having thus described my invention, what I claim as new is:—

1. Transmission means of the class described comprising a drive shaft, a main shaft, a counter-shaft, constantly meshing gears connecting the drive shaft with the counter-shaft, low, intermediate, and high speed gears rotatably arranged on the main shaft, gears on the counter-shaft in constant mesh with the last-mentioned gears, a forward drive overrun clutch for connecting each of the gears of the main shaft to said main shaft, overrun hold-back clutch means for connecting each of the last-mentioned gears with the main shaft, the last-mentioned clutch means being reversely arranged to the first mentioned clutch means, means for normally holding the forward drive clutch means of the intermediate and high speed gears in inoperative position, and the hold-back clutch means in operative position, governor controlled means for progressively moving the forward drive clutch means of the intermediate and high speed gears into operative position, and the hold-back clutch means of the first and intermediate speed gears into inoperative position.

2. Transmission means of the class described comprising a drive shaft, a main shaft, a counter-shaft, constantly meshing gears connecting the drive shaft with the counter-shaft, low, intermediate, and high speed gears rotatably arranged on the main shaft, gears on the counter-shaft in constant mesh with the last-mentioned gears, a forward drive overrun clutch for connecting each of the gears of the main shaft to said main shaft, overrun hold-back clutch means for connecting each of the last-mentioned gears with the main shaft, the last mentioned clutch means being reversely arranged to the first-mentioned clutch means, means for normally holding the forward drive clutch means of the intermediate and high speed gears in inoperative position, and the hold-back clutch means for progressively moving the forward drive clutch means of the intermediate and high speed gears into operative position, and the hold-back clutch means of the first and intermediate speed gears into inoperative position, and means for rendering all of the hold-back clutch means inoperative when free wheeling is desired.

3. Transmission means of the class described comprising a drive shaft, a driven shaft, a main shaft in alinement with the drive and driven shafts, a counter-shaft, constantly meshing gears connecting the drive shaft with the counter shaft, reverse speed means for connecting the counter shaft with the driven shaft, clutch means for connecting the main shaft with the driven shaft, low, intermediate and high speed gears rotatably arranged on the main shaft, gears carried by the counter-shaft and in constant mesh with the last-mentioned gears, overrun forward drive clutches for connecting the gears of the main shaft therewith, overrun hold-back clutches, reversely arranged to the drive gears for connecting each of the gears of the main shaft therewith, each of said clutch means including spring pressed pawls, members slidably arranged on the drive shaft and having projections thereon for holding all of the pawls of all of the clutch means excepting the forward drive clutch at the low speed gear, in inoperative position, forks engaging said members, a yoke member, governor means on the driven shaft for operating the yoke member, cams on one arm of the yoke for operating the forks of the forward drive clutches of the intermediate high speed gears to progressively move the members to releasing position, means for normally holding said fork in position with the said members in operative position, cam means on the other limb of the yoke for progressively moving the forks of the hold-back clutches of the low and intermediate gears to position for moving the members into operative position to move the pawls of said clutches into inoperative position, spring means on the said other limb of the yoke for normally holding said forks with the members in inoperative position, a rod connected with the fork of the hold-back clutch of the high speed gear and having projections thereon engaging the forks of the other hold-back clutch means, and means for moving said rod to a position to move the forks to cause the projections of the members to move the pawls of the hold-back clutches to releasing position when free wheeling is desired.

4. A transmission device of the class described comprising a first shaft and a second shaft, a number of gears fastened to the second shaft, gears rotatably arranged on the first shaft and meshing with the gears of the second shaft, forward drive overrun clutch means for engaging said gears of the first shaft with the first shaft, overrun hold-back clutch means for connecting said gears with the first shaft, means for normally holding the forward drive clutch means of the intermediate and high speed gears in inoperative position and means for progressively moving the forward drive clutch means of the intermediate and high speed gears into operative position and the hold back clutch means of the first and intermediate speed gears into inoperative position.

In testimony whereof I affix my signature.

FRANK E. WIGERT.